United States Patent
Apers et al.

(10) Patent No.: US 12,074,727 B2
(45) Date of Patent: Aug. 27, 2024

(54) UNIT FOR CONTROLLING DATA COMMUNICATION

(71) Applicant: CONSTELL8, Hemiksem (BE)

(72) Inventors: Roel Apers, Hemiksem (BE); Wouter Moors, Bocholt (BE); Roel Velkeneers, Antwerp (BE)

(73) Assignee: CONSTELL8, Hemiksem (BE)

( * ) Notice: Subject to any disclaimer, the term of this patent is extended or adjusted under 35 U.S.C. 154(b) by 355 days.

(21) Appl. No.: 17/432,837

(22) PCT Filed: Feb. 25, 2020

(86) PCT No.: PCT/EP2020/054939
§ 371 (c)(1),
(2) Date: Aug. 20, 2021

(87) PCT Pub. No.: WO2020/173958
PCT Pub. Date: Sep. 3, 2020

(65) Prior Publication Data
US 2022/0141050 A1    May 5, 2022

(30) Foreign Application Priority Data
Feb. 28, 2019   (BE) .................................. 2019/5127

(51) Int. Cl.
*H04L 12/40* (2006.01)
*H04L 5/14* (2006.01)
*H04L 12/46* (2006.01)

(52) U.S. Cl.
CPC ......... *H04L 12/40006* (2013.01); *H04L 5/14* (2013.01); *H04L 12/4625* (2013.01)

(58) Field of Classification Search
CPC .. H04L 12/40006; H04L 5/14; H04L 12/4625
See application file for complete search history.

(56) References Cited

U.S. PATENT DOCUMENTS

| 10,411,793 | B1* | 9/2019 | Ramsey | ............... G06F 21/64 |
| 2009/0235001 | A1 | 9/2009 | Buttner et al. | |
| 2013/0138996 | A1* | 5/2013 | Beyer | ............... H04L 12/4625 |
| | | | | 714/4.2 |
| 2018/0097643 | A1* | 4/2018 | Raleigh | ............. H04M 15/8033 |
| 2020/0120360 | A1* | 4/2020 | Rassool | ......... H04N 21/234327 |
| 2020/0177638 | A1* | 6/2020 | Salman | ................ H04L 63/205 |

OTHER PUBLICATIONS

International Search Report and Written Opinion from corresponding PCT Application No. PCT/EP2020/054939, Mar. 18, 2020.
Search Report from corresponding Belgium Application No. BE201905127, Aug. 6, 2019.

* cited by examiner

*Primary Examiner* — Walter J Divito
(74) *Attorney, Agent, or Firm* — Workman Nydegger

(57) ABSTRACT

A system for controlling an entertainment installation comprising one or more devices, wherein the system comprises: for each of the devices, a control unit; for each of the devices, a communication unit comprising a first communication port, a second communication port, a switch component, and a bypass component; one or more data connections suitable for full-duplex communication; a central management unit comprising a monitoring module suitable for receiving monitoring messages from the devices.

15 Claims, 12 Drawing Sheets

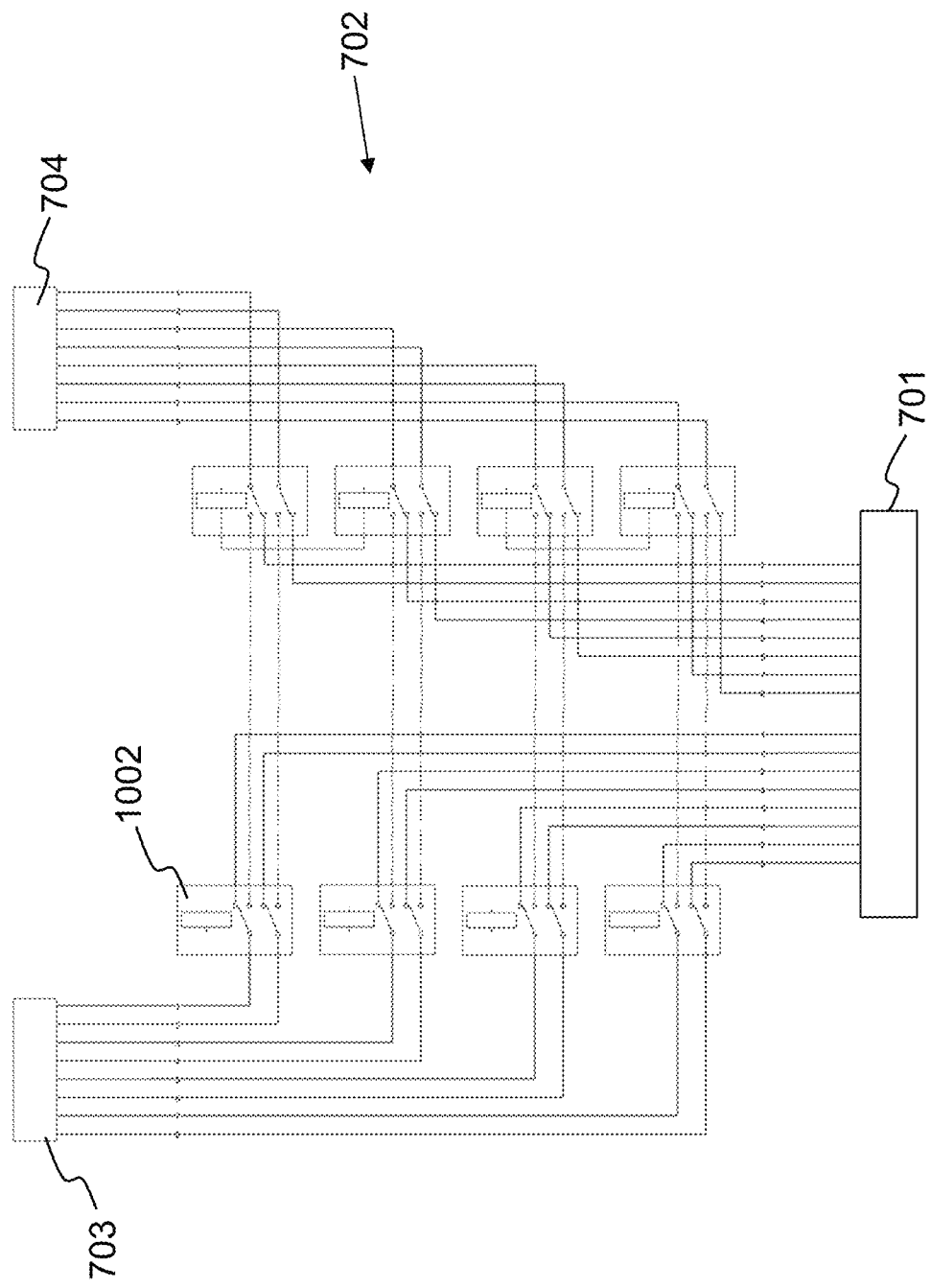

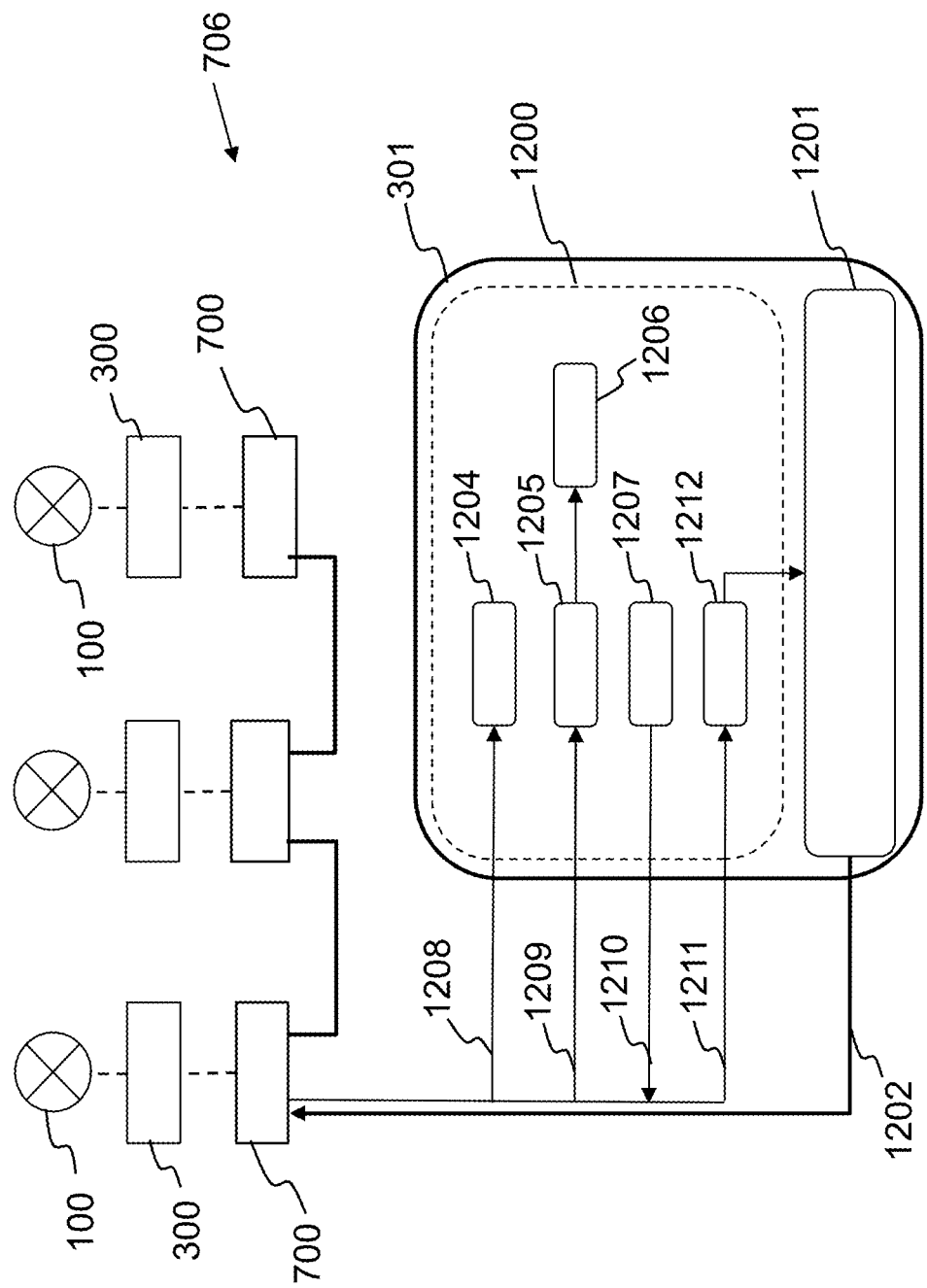

UNIT FOR CONTROLLING DATA COMMUNICATION

TECHNICAL FIELD

The present invention relates in general to the control of data communication with devices in an entertainment installation, which are controlled on the basis of data that they receive. In particular, the invention offers a solution that provides redundant control, allows straightforward setup and configuration, and enables straightforward monitoring while the installation is in operation.

BACKGROUND OF THE INVENTION

In entertainment applications such as festivals, concerts and theatrical performances, professional installations are employed to control devices such as for example spotlights and/or loudspeakers. In this case, the way in which the devices are to behave is set via a central light or sound console and these control data are sent to the various lights or loudspeakers via a network of communication cables. These installations are often rather extensive, with hundreds of connected devices. Users of such professional installations are often faced with the problem that a different installation is set up for each new event or show, for which a new setup and configuration of the communication network is required in each case. This entails a large number of settings, given the extent of the installation. Once the entertainment installation is in operation, users are faced with problems arising in the transfer of data, caused by interruptions in the power supply or faulty connections, as a result of which the control of the devices is disrupted. Ultimately, given the large number of connected devices, it is not straightforward to detect whether and where a fault has occurred. Consequently, there is a general need for solutions which allow reliable data transfer, and which are straightforward for the user to configure and to operate.

The conventional DMX solution is known, in which the DMX512 (Digital Multiplex) protocol is used for the communication of data. Despite the fact that this protocol is now 32 years old, it is still often used today in the professional AV market. DMX uses the RS-485 standard as interface, which allows only half-duplex communication. FIG. 1 shows an arrangement of such a DMX solution, wherein lights 100 are controlled from a central console 102. Since DMX is limited by the standard to 512 channels, this is not sufficient to connect all connected devices to one DMX controller if the sum of the channels required by the devices is greater than 512. Therefore, what are referred to as DMX universes 101 are employed, which are parallel DMX lines that are used simultaneously, see FIG. 1.

Such a conventional DMX solution comes with a number of limitations. First, when connecting the devices, the user should take into account the limitation of 512 channels per universe and, if necessary, start a new universe. In this way, a plurality of devices in one setup may have the same start address because they are connected to another universe. This limit of 512 channels and the use of various universes to overcome it results in substantial complexity during the preparation, connection and setup of the installation. Because it is complex and inefficient to lay physical cables to the controller for all of these universes, there are also solutions, such as illustrated in FIG. 2, in which the DMX-512 signal is conveyed over Ethernet between the console 102 and an Ethernet-DMX converter 200. In this case, a plurality of DMX universes are conveyed over one cable. All universes are transmitted sequentially, so that each universe is addressed "in turn". With each hop in the network, a delay results due to the handling of the packet in this hop. This is referred to as residence time. With a plurality of hops in the network, the residence time will be multiplied by the number of hops and accumulated residence time results, which leads to a synchronization problem between the first and the last hop in the network.

In addition to the fact that, due to the 512-channel limit, setting up a conventional DMX solution is complicated, configuring such a solution is also laborious. For this, the user or technician has to undertake "patching" before being able to operate the connected devices. "Patching" is the term used to define the process in which the virtual description of the setup is implemented in the real world using DMX addresses and the what are known as universes. The connected devices can be operated by listening for a set start address in the DMX universe to which they are physically connected. This start address must be set per device and be made known to the controller. Depending on the set options or settings, the number of channels used may vary per device, even if they are of the same type. This means that problems may arise with one device reacting in an unintended manner to control meant for another device, due to the overlap in the range over which they listen for the DMX signal. With most lighting controllers, devices are assigned a unique ID during patching which is fundamentally linked to a certain start address in a certain universe. For this, what is referred to as a fixture file is typically used. This file represents the possibilities for the device to be controlled. This fixture file, which varies per device type, must be loaded into the controller in advance. In an offline context, which applies to most controllers, this complicates the patching process.

Another limitation of the conventional DMX solution lies in the area of reliability or redundancy. In the conventional DMX solution, all connected devices in a DMX universe are connected to one another by means of daisy-chaining. What is meant by daisy-chaining is that the connected devices are linked together from one to the next. Inside the device, the input and output of the signal are connected to one another directly. All devices thus receive the same control but listen only for the channels from the set start address. This has the advantage that when one or more devices in the middle of the chain suffer a power interruption, the devices connected further along the chain continue to receive their signal correctly. In other words, their correct control is not affected by the devices connected in front of them, and in the case of a power interruption, daisy-chaining provides redundant control of the devices. However, in the case of a faulty cable or another problem, other than the abovementioned power interruption, those devices which are located "after" the problem on the line will receive a faulty signal or no signal at all. Given that all devices are connected in succession on the DMX line, there is no possibility of reaching the connected devices via an alternative route. Consequently, the conventional DMX solution does not provide completely redundant control, since data transfer cannot be guaranteed in the event of problems such as a faulty cable.

The final limitation with the conventional DMX solution arises as a result of the use of the RS-485 standard as interface, which is half-duplex. This means that transmission and reception takes place over the same signal lines, but never simultaneously. This limitation results in an extra protocol being needed in order to provide two-way communication. Therefore, the RDM Protocol was developed a few years ago, which can be implemented as an extension to DMX to afford receivers the possibility of communicating "back". This takes place by means of a request/response system. The lighting controller will send a request to one of the receivers (devices), whereupon the controller will set itself to receiver mode and the receiver will play the role of transmitter. The device responds to the request, after which both parties revert to their original state. However, RDM comes with a number of limitations. First, RDM is a very slow protocol, and it has low bandwidth. It is also completely based on timing and therefore difficult to implement. In addition, there can and should always be a "master" present on the line. Because of this, the distribution of information on what is happening in the connected devices is still very limited, so that it is difficult for the user to gain insight into whether and where there are problems in the network.

In addition to the conventional DMX solution, Ethernet-based solutions are also known in the prior art. In this case, ethernet technology is used to convey data between the central console and the connected devices. Various topologies are used in this case. For example, the devices are connected in series, with a switch in each device which determines whether the data packet is intended for the device itself or should be relayed to the next device. Another possibility is the use of a star topology, wherein each device is connected to a central switch which receives data from the console and routes them to the appropriate device.

These Ethernet-based solutions also have a number of limitations. First, a consequence of using Ethernet is that the user's knowledge must be broadened with network technology and associated protocols. This can present a barrier in practice.

In addition, it is not possible with these Ethernet-based solutions to provide the connected devices with redundant control. Ethernet is full-duplex and daisy-chaining with devices connected in series is not possible in this case. In the case of a power interruption for one of the devices connected in series, the switch of this device ceases to operate, so that there is no longer any signal to the devices further along in the chain. This problem does not occur when using a star topology, but the greatest drawback of a star topology is that it requires extra cabling to the hub of the star. Furthermore, an extra component is needed in this case, namely the network switch. This network switch is a weak point for redundancy.

Lastly, the known Ethernet-based solutions have limitations in terms of the communication protocol used. Typically, a protocol that builds upon the DMX512 and RDM protocol is used, such as for example Art-Net and ArtRdm. These are straightforward Ethernet implementations of the conventional DMX512 and RDM protocol, as a result of which the typical DMX problems mentioned above are incorporated into this standard.

The above shows that there is currently no solution in the prior art which allows straightforward setup and completely redundant control. In addition, none of the existing solutions afford the user the possibility of being able to consult information regarding the network in a straightforward manner, information such as how the devices are physically connected to one another or where problems in the network are occurring. This complicates both the initial configuration of the network and the solving of problems while the installation is in operation.

An object of the present invention is to describe a solution for controlling a professional entertainment installation which overcomes the above-described drawbacks of solutions from the prior art. More specifically, an object of the present invention is to describe a solution that provides redundant control, allows straightforward setup and configuration, and enables straightforward monitoring while the installation is in operation.

SUMMARY OF THE INVENTION

According to a first aspect of the invention, what is provided is a system for controlling an entertainment installation comprising one or more devices, wherein said system comprises:
   for each of the one or more devices, a control unit;
   for each of the one or more devices, a communication unit;
   a central management unit suitable for generating data;
   one or more data connections suitable for communicating data between the central management unit and the communication unit of the one or more devices, suitable for full-duplex communication,
wherein the communication unit comprises:
   a first communication port and a second communication port, suitable for connecting the communication unit to the data connections;
   a switch component suitable for exchanging data with the management unit, via full-duplex communication;
   a bypass component suitable for switching the communication unit between a first state and a second state, in such a way that, in the first state, the first communication port and the second communication port are connected to the switch component, and, in the second state, the first communication port is connected to the second communication port,
and wherein the central management unit comprises a monitoring module suitable for receiving monitoring messages from the one or more devices, comprising one or more characteristics of the device and/or of a device connected to the device.

In other words, the invention relates to a system for controlling an entertainment installation. An entertainment installation comprises one or more devices. A device is a machine that is suitable for performing a certain action or function, and that is controlled by a control unit which, on the basis of received control data, determines which actions the device should perform. For example, the device is a light or a spotlight, suitable for producing light, or a loudspeaker, suitable for producing sound. Such a device typically forms part of a complete installation comprising a large number of devices, for example a professional entertainment installation. A device may also be an AV (audio/video) device. Still other examples of a device are: a projector, a camera, a monitor, a hoist, a moving scenery element, a machine for generating special effects such as flames or fog, etc. The device is controlled by a control unit, for example a controller which receives data and, on the basis of this data, places the device in the desired state, for example turns the light on or off, sets the desired light intensity or colour, the desired sound volume, performs the desired movement, etc. Furthermore, there is a communication unit per device, for example an add-on board, which is connected to the host board of the control unit in order to exchange data. In another embodiment, the communication unit and the control unit are embodied by one board.

The system further comprises a central management unit. For example, this is a lighting console or sound console by means of which, manually or via a computer, data are generated in order to control the devices. These data are communicated to the communication units via data connections, for example communication cables. The data connections run between the central management unit and a communication unit, or between communication units themselves. The data communication may thus pass directly between the central unit and the device, or the device may receive its data via a device connected in series. The data connections are suitable for full-duplex communication, which means that transmission and reception can take place at the same time.

The communication unit comprises a first communication port and a second communication port. Each of these communication ports is suitable for connecting the communication unit to a data connection. A data connection is typically a communication cable. The data connections allow data, for example control data, to be transmitted to the communication unit or to be received from the communication unit.

The data connections are suitable for full-duplex communication. This means that the data can be conveyed through the data connections in two different directions simultaneously, without interfering with one another. For example, such full-duplex communication may be obtained by means of Ethernet. Using such data connections has the advantage that there is no limitation on the number of channels, as a result of which, in contrast with the conventional DMX solution, no parallel universes need to be used. In other words, the invention makes it possible to connect the cables as desired during installation without having to take into account the maximum number of devices on a line. This contributes to simplifying the setup of the installation.

The communication unit further comprises a switch component suitable for exchanging data with the control unit. During normal operation of the device, i.e. when the device is being supplied with power, the switch component receives data via a communication port, it decides whether these data are intended for the device, and it then relays this data to either the control unit (for controlling the device itself), or another communication port (for relaying to another device). Typically, the switch component is an ordinary or a managed switch in combination with a microprocessor. The switch component is suitable for full-duplex communication, which means that it allows data to be transmitted and to be received over one connection simultaneously. The full-duplex data connections and switch have the advantage that a device is able simultaneously to receive data, for example control data, and to transmit data, for example identifying characteristics, error messages, alerts regarding maintenance requirements, notifications from sensors, etc. In this way, a device is given the capacity to communicate itself whenever the device deems it necessary. In contrast with existing solutions, in which two-way communication is established via a half-duplex request/response system, the invention allows fast two-way communication with unlimited possibilities for distributing information from the network.

The communication unit further comprises a bypass component suitable for switching the communication unit between a first state and a second state. The first state is for example the normal state, in which the device operates as it should. In the first state, the first and second communication ports are each connected to the switch component. In that case the communication unit receives data via a communication port, and the switch component relays the data to the control unit or another communication port. Switching to the second state occurs for example when, as a result of a fault, no power is being supplied to the device. In the second state, both communication ports are connected directly to one another, and the data are relayed directly from one port to the other without going through the switch component. In other words, the switch component is bypassed.

The bypass component comprises for example switches or relays, which are located between the switch component and each of the two communication ports. Depending on whether the device is being supplied with power or not, the switches or relays then switch to another state. As a result, in the first state, a data connection is formed between the first communication port, the switch component and the second communication port. Conversely, in the second state, for example obtained via another state of the switches or relays, a data connection is formed between the first communication port and the second communication port. The possibility to bypass the switch component has the advantage that, in the event of a problem such as no supply of power to the device, the data are still relayed to the next device, and the data transfer in the case of devices connected in series is thus not disrupted. In this way, in contrast to the known Ethernet solutions, the switch in the device no longer forms the critical component that prevents redundant control, and redundancy in the event of an interrupted supply of power to the device is guaranteed, as is the case with DMX daisy-chaining.

The system further comprises a monitoring module suitable for receiving monitoring messages from the one or more devices, comprising one or more characteristics of said device and/or of a device connected to said device. The monitoring module allows monitoring messages to be collected from the network and then to be processed in a centralized manner. A monitoring message comprises for example information on which neighbouring device is connected to the device; in other words, the device indicates which are its neighbours that are connected to its own ports. This has the advantage that the user is able to gain insight into which devices are present in the network, and their mutual connections, in a straightforward manner. The monitoring message may also comprise a characteristic relating to the state of the device, or a characteristic relating to the state of the neighbouring device. In this way, an error message can be sent, or a device can indicate that its neighbour has gone dead. In this manner, the user obtains a clear picture of where problems in the network are occurring, which gives them the opportunity to intervene in a targeted manner.

The system for controlling an entertainment installation according to the invention thus provides a solution that is redundant, straightforward to set up and to configure, and from which information relating to the network can be collected in a straightforward manner. Finally, it should be noted that they system in which the present communication units comprise no bypass component, but in which a monitoring module and full duplex data connections are present, still also provides the advantage of straightforward setup and information collection. The provision of the bypass component on the communication units provides the additional advantage that redundant control and reliable information collection are provided.

Optionally, the system further comprises a mapping module suitable for producing a connection diagram on the basis of received monitoring messages, which connection diagram comprises one or more features of the one or more devices and their connections. A connection diagram is for example a representation of which devices are present in the network, and their cabling. In other words, the connection diagram shows the topology of the network, i.e. a complete map of which devices are present and how the cables are connected. This has the advantage that the user is assisted in assigning IDs of their choice to the devices. The connection diagram may also represent characteristics relating to the data transfer via the cabling. This means that the connection diagram shows not only the physical cabling, but also indicates via which connections data are transferred. For example, the data from an RSTP protocol, required to achieve ring redundancy, may be interpreted, processed and made available via an API. This contributes to active and real-time monitoring by the user, and problems or faults being solved quickly.

Optionally, the system further comprises a discovery module suitable for receiving and/or transmitting discovery messages from and/or to the one or more devices. The discovery module forms part, for example, of the central management unit, or forms a standalone module which also communicates via the network. A discovery message comprises one or more identifying characteristics of the device, for example an ID or identification number, or certain metadata. The presence of a discovery module has the advantage that the user is able to gain insight into which devices are present in the network in a straightforward manner. The central controller, for example on the lighting console, is in this way also able to receive information on which devices are located in the network and how it should operate the device. This contributes to a straightforward setup and configuration of the network.

Optionally, the system further comprises a configuration module suitable for sending a configuration message to a communication unit. A configuration message comprises one or more parameters for configuring the communication unit or the control unit. For example, such a parameter is a configuration parameter of the configurable switch component, by means of which its settings can be modified so as to create an alternative route to the device, i.e. to create ring redundancy. Another example of such a parameter is an initialization parameter, such as an ID, which is chosen by the user and relayed to the communication unit. For example, a user can directly assign fixture IDs with the aid of a connection diagram that shows the cabled topology. The device receives this fixture ID via the configuration module, as a result of which the configuration is stored in a decentralized manner. This is to the benefit of redundancy. In addition, a new user on an existing setup is able to view the configuration of the entire setup from the decentrally stored information. In this way, there need be no more handover between controllers and their operators, in contrast to in the current state of the art. A configuration message may also comprise certain metadata of the device, or other data for configuring the device. This allows the user to run the configuration of the network automatically and remotely, which contributes to a straightforward setup.

Optionally, the system further comprises a synchronization module suitable for collecting time information relating to the communication unit and for incorporating this time information into the data used for control. For example, the switch component employs PTP (precision timing protocol), by means of which the processing time in one communication unit is measured using timestamping. This value is added to the data packet, after which this process can be repeated on each hop. In this way, the synchronization module is able to measure, when the system comes online or in the event of changes to the topology, how long it takes for all network packets to be received by all receiving devices. Using these results, the maximum frame rate and maximum lag can be determined. In addition, this information can be used to obtain accurate synchronization across the various devices. In this case, commands relating to the exact time when an action should be performed are incorporated into the data sent to the devices. The device may perform the action to be performed only at the exact time indicated by the command for this.

Optionally, the data connection employs full-duplex Ethernet technology. Full-duplex Ethernet employs two lines for the simultaneous transmission and reception of data. This prevents data transfer in the two directions from mutually interfering, thereby leading to optimal performance.

Optionally, the switch component is configurable. For example, the switch component is a combination of a "managed switch" and a microprocessor, wherein the settings of the switch can be adjusted via a microprocessor. In this way, the configuration of the switch component can be adjusted during the use of the communication unit, for example in order no longer to receive the data traffic via the first communication port but via the second communication port instead. This has the advantage of providing extra redundancy. Indeed, the use of the configurable switch component allows the user to implement ring redundancy, with the devices being cabled in one or more rings. In the event of a fault in a cable or device, an alternative route can therefore be chosen in order to reach the device, thereby preventing data traffic from coming to a standstill. This alternative route is obtained by changing the configuration of the appropriate switches, and by applying a protocol such as for example RSTP (Rapid Spanning Tree Protocol). Optionally, the switching to an alternative route may take place completely automatically, even during live control. When a fault in a cable suddenly occurs, all settings in the network are automatically adjusted and the alternative route takes over.

Optionally, the bypass component is suitable for switching, when the device is active, the communication unit to the first state, and, when the device is inactive, switching the communication unit to the second state. For example, the device is inactive when the device is not being supplied with power or the device is not live. In such a state, the bypass component switches the communication unit to the second state, in which the two communication ports are directly connected to one another.

Optionally, the bypass component employs one or more switches or relays. Such switches or relays are located between the switch component and the first communication port, and between the switch component and the second communication port. For example, changeover relay switches are employed, which are open or closed depending on the voltage state of the device. This has the advantage of obtaining, in a straightforward manner, automatic switching of the bypass component to the desired state depending on the voltage state of or supply of power to the device.

Optionally, the communication unit further comprises one or more extra communication ports suitable for connecting the communication unit to a data connection suitable for full-duplex communication. These communication ports are extra communication ports, in addition to the first and second communication ports already present. For example, there may be a third communication port, or a third and a fourth communication port. The presence of extra communication ports allows the user to obtain a desired network topology. The one or more extra ports may also be used, for example, to provide data transfer from an additional source, for example a sound console which employs the network of lights to supply data to a loudspeaker.

Optionally, one or more of the extra communication ports are suitable for receiving electric current. This means that power is also supplied via the data connection to which, for example, the third communication port is connected, in other words the port may act as a PD (powered device). For example, PoE (Power over Ethernet) is employed. This has the advantage that the communication unit is able to start up by itself: communication with another device can be brought about without the host device having to start up or to be supplied with power for this.

According to a second aspect of the invention, what is provided is a method for controlling an entertainment installation comprising one or more devices, comprising:

providing a central management unit, one or more data connections suitable for full-duplex communication, a control unit for each of the one or more devices, and a communication unit for each of the one or more devices, wherein a communication unit comprises: a first communication port, a second communication port, a bypass component and a switch component;

generating data by the central management unit;

communicating data between the central management unit and a communication unit, via the data connections;

controlling each of the one or more devices by the control unit;

controlling data communication by means of the control unit, comprising:

communicating data via the data connections, connected to the first and/or second communication port;

switching of the communication unit between a first state and a second state, wherein, in the first state, the first communication port and the second communication port are connected to the switch component, and, in the second state, the first communication port is connected to the second communication port, exchanging data between the switch component and the management unit, via full-duplex communication;

receiving, by the central management unit, monitoring messages from the one or more devices, comprising one or more characteristics of the device and/or of a device connected to the device.

In other words, the invention relates to a method for controlling an entertainment installation, comprising one or more devices. A device is a machine that is suitable for performing a certain action or function, and that is controlled by a control unit which, on the basis of received control data, determines which actions the device should perform. For example, the device is a light or a spotlight, suitable for producing light, or a loudspeaker, suitable for producing sound. Such a device typically forms part of a complete installation comprising a large number of devices, for example a professional entertainment installation. A device may also be an AV (audio/video) device. Still other examples of a device are: a projector, a camera, a monitor, a hoist, a moving scenery element, a machine for generating special effects such as flames or fog, etc. The device is controlled by a control unit, for example a controller which receives data and, on the basis of this data, places the device in the desired state, for example turns the light on or off, sets the desired light intensity or colour, the desired sound volume, performs the desired movement, etc. Data, for example data that is generated on a central lighting or sound console or central management unit, and that comprises typical control commands, is communicated to the control unit of the device. This data communication may pass directly between the central unit and the device, or the device may receive its data via a device connected in series. In the method according to the invention, a communication unit is provided per device. The communication unit is for example an add-on board which is connected to the host board of the control unit in order to exchange data, or is integral with the control unit.

In a step of the method according to the invention, data are communicated via one or more data connections suitable for full-duplex communication. These data connections are connected to the first and/or second communication port(s) of the communication unit. A data connection is typically a communication cable. Typically, control data are for example transmitted to the communication unit.

The data connections are suitable for full-duplex communication. This means that the data can be conveyed through the data connections in two different directions simultaneously, without interfering with one another. For example, such full-duplex communication may be obtained by means of Ethernet. Using such data connections has the advantage that there is no limitation on the number of channels, as a result of which, in contrast with the conventional DMX solution, no parallel universes need to be used. In other words, the invention makes it possible to connect the cables during installation as desired without having to take into account the maximum number of devices on a line. This contributes to simplifying the setup of the installation.

The method according to the invention further comprises the exchange of data by means of a switch component on the communication unit. In this case, the switch component exchanges data with the control unit, with the first communication port and with the second communication port, via full-duplex communication. During normal operation of the device, i.e. when the device is being supplied with power, the switch component receives data via a communication port, it decides whether these data are intended for the device, and it then relays this data to either the control unit (for controlling the device itself), or another communication port (for relaying to another device). Typically, the switch component is an ordinary or a managed switch in combination with a microprocessor. The switch component is suitable for full-duplex communication, which means that it allows data to be transmitted and to be received over one connection simultaneously. This has the advantage that a device is able simultaneously to receive data, for example control data, and to transmit data, for example identifying characteristics, error messages, alerts regarding maintenance requirements, notifications from sensors, etc. In this way, a device is given the capacity to communicate itself whenever the device deems it necessary. In contrast with existing solutions, in which two-way communication is established via a half-duplex request/response system, the invention allows fast two-way communication with unlimited possibilities for distributing information from the network.

The method according to the invention further comprises the switching of the communication unit between a first state and a second state by means of a bypass component on the communication unit. The first state is for example the normal state, in which the device operates as it should. In the first state, the first and second communication ports are each connected to the switch component. In that case the communication unit receives data via a communication port, and the switch component relays the data to the control unit or another communication port. Switching to the second state occurs for example when, as a result of a fault, no power is being supplied to the device. In the second state, both communication ports are connected directly to one another, and the data are relayed directly from one port to the other without going through the switch component. In other words, the switch component is bypassed.

The bypass component comprises for example switches or relays, which are located between the switch component and each of the two communication ports. Depending on whether the device is being supplied with power or not, the switches or relays then switch to another state. As a result, in the first state, a data connection is formed between the first communication port, the switch component and the second communication port. Conversely, in the second state, for example obtained via another state of the switches or relays, a data connection is formed between the first communication port and the second communication port. The possibility to bypass the switch component has the advantage that, in the event of a problem such as no supply of power to the device, the data are still relayed to the next device, and the data transfer in the case of devices connected in series is thus not disrupted. In this way, in contrast to the known Ethernet solutions, the switch in the device no longer forms the critical component that prevents redundant control, and redundancy in the event of an interrupted supply of power to the device is guaranteed, as is the case with DMX daisy-chaining.

The method according to the invention further comprises the reception, by the central management unit, of monitoring messages from the one or more devices, comprising one or more characteristics of the device and/or of a device connected to the device. A monitoring message comprises for example information on which neighbouring device is connected to the device; in other words, the device indicates which are its neighbours that are connected to its own ports. This has the advantage that the user is able to gain insight into which devices are present in the network, and their mutual connections, in a straightforward manner. The monitoring message may also comprise a characteristic relating to the state of the device, or a characteristic relating to the state of the neighbouring device. In this way, an error message can be sent, or a device can indicate that its neighbour has gone dead. In this manner, the user obtains a clear picture of where problems in the network are occurring, which gives them the opportunity to intervene in a targeted manner.

BRIEF DESCRIPTION OF THE DRAWINGS

FIG. 11 shows an embodiment of the bypass component, according to an embodiment of invention.

FIG. 12 shows an embodiment of a system according to the invention, wherein modules present in a central management unit are represented schematically.

DETAILED DESCRIPTION OF THE EMBODIMENTS

Figure 1:
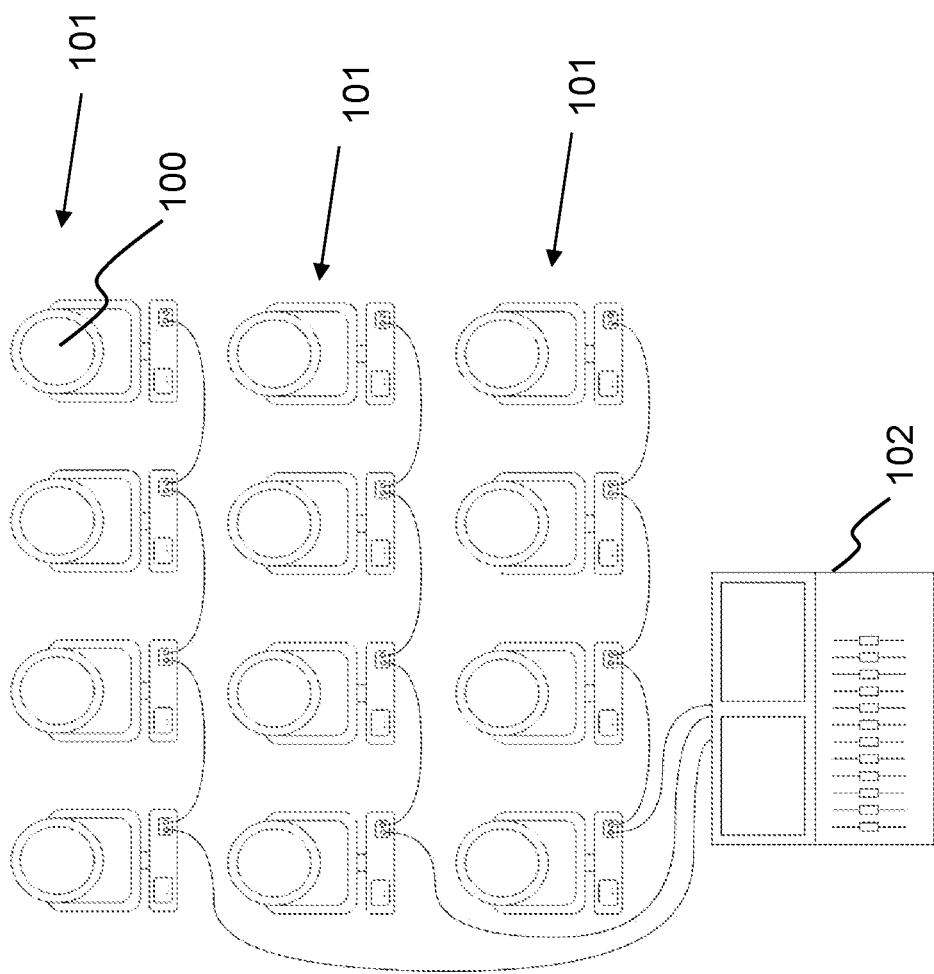
FIG. 1 shows a possible topology of a conventional DMX solution, known from the prior art.

FIG. 1 shows a possible topology of a conventional DMX solution, known from the prior art. FIG. 1 shows lights 100 controlled from a central console 102. A number of DMX universes 101 are also represented, which are parallel DMX lines that are used simultaneously. The use of such DMX universes 101 is necessary due to the 512-channel limit in the DMX solution.

Figure 2:
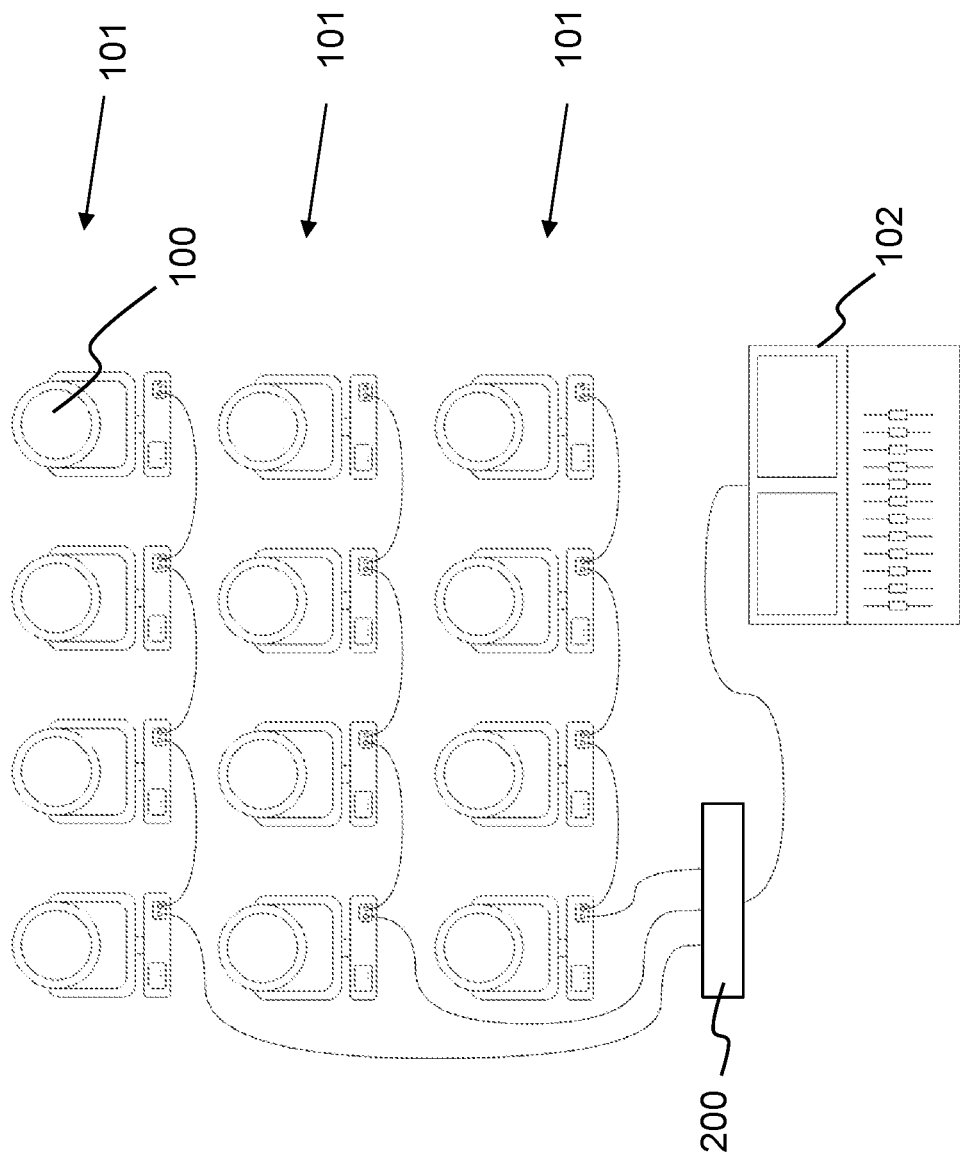
FIG. 2 shows a topology comprising a combination of a conventional DMX solution, an Ethernet connection to the central console, and an Ethernet-DMX converter, known from the prior art.

FIG. 2 shows a topology comprising a combination of a conventional DMX solution, an Ethernet connection to the central console 102, and an Ethernet-DMX converter 200, known from the prior art. In this case, the DMX-512 signal is conveyed over Ethernet between the console 102 and an Ethernet-DMX converter 200, in order to avoid physical cables having to be laid to the console 102 for all of the universes 101.

Figure 3:
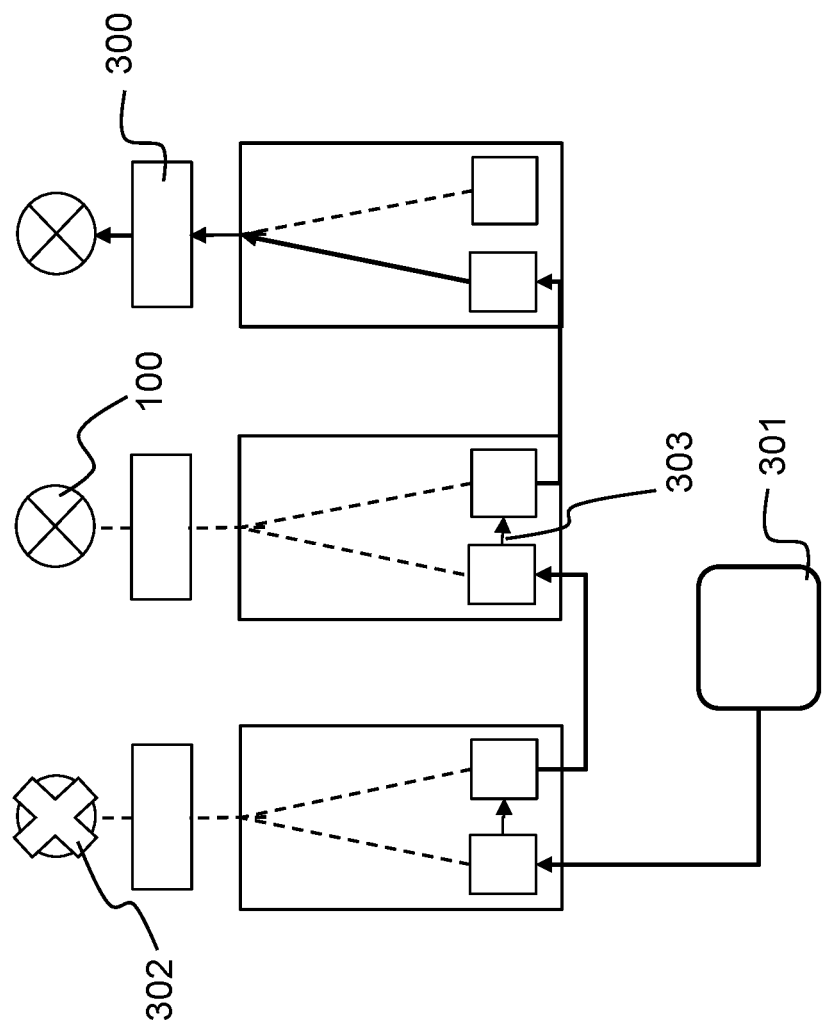
FIG. 3 is a schematic representation of daisy-chaining used in a conventional DMX solution according to the prior art, and illustrates what happens when the supply of power to a device is interrupted.
Figure 4:
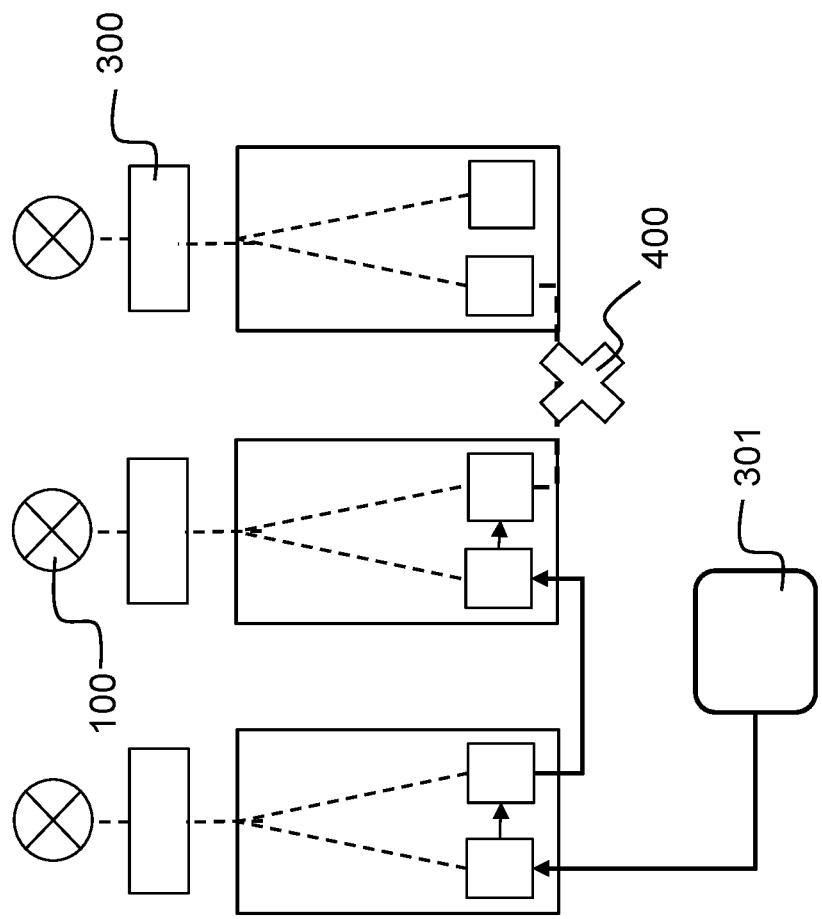
FIG. 4 is a schematic representation of daisy-chaining used in a conventional DMX solution according to the prior art, and illustrates what happens when there is a problem with the cabling.

FIG. 3 and FIG. 4 show a schematic representation of daisy-chaining, which is used in a conventional DMX solution according to the prior art. FIG. 3 illustrates what happens in the case of daisy-chaining when the supply of power to a device is interrupted. The figure shows a central management unit 301. For example, this is a lighting console or sound console by means of which, manually or via a computer program, data are generated in order to control the devices 100. A device 100 is a machine that is suitable for performing an action, for example producing light, sound, movements, etc. For example, it is a light, a spotlight, a loudspeaker, a camera, a monitor, a hoist, etc. Each device 100 has a control unit 300, for example a controller, which is able to interpret received control data and translate it into a desired state of the device 100, for example the light is turned on or off, a desired light intensity is set, a desired colour is set, etc. In the DMX solution as represented in FIG. 3, the devices 100 are connected in series, i.e. the data are relayed from the central management unit 301 to a device 100, and then on to a next device 100. In the case of use of DMX daisy-chaining, the connected devices 100 are linked together from one device 100 to the next, as shown in FIG. 3, via a data connection 303. In the event of an interruption 302 in the supply of power to a device 100, the devices 100 further along in the chain receive their signal correctly. However, in the event of a fault in a faulty cable or another problem, than the abovementioned power interruption, those devices which are located "after" the problem on the line will receive a faulty signal or no signal at all. This is illustrated in FIG. 4. The interruption 400 results in the device 100, which in the figure is the last one in the chain, no longer receiving any data signal. Therefore, with the conventional DMX solution which employs daisy-chaining, such as known from the prior art, completely redundant control is not obtained.

Figure 5:
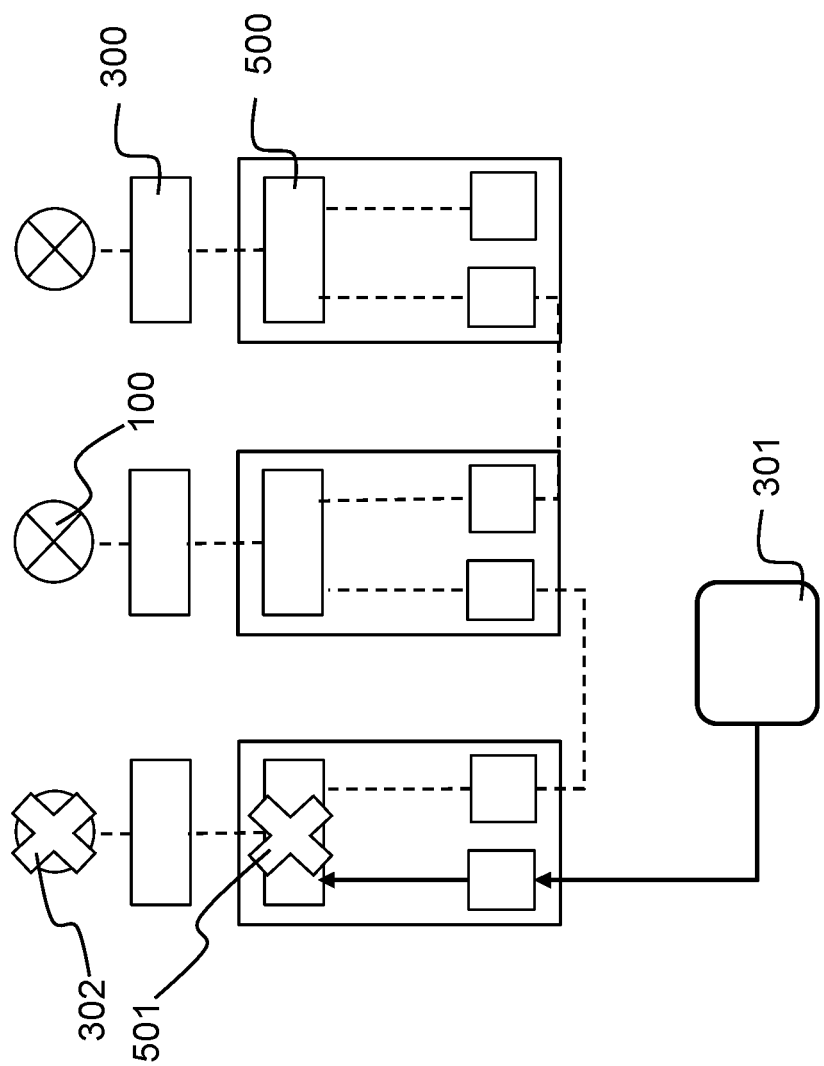
FIG. 5 is a schematic representation of an Ethernet-based solution according to the prior art, and illustrates what happens when the supply of power to a device is interrupted.
Figure 6:
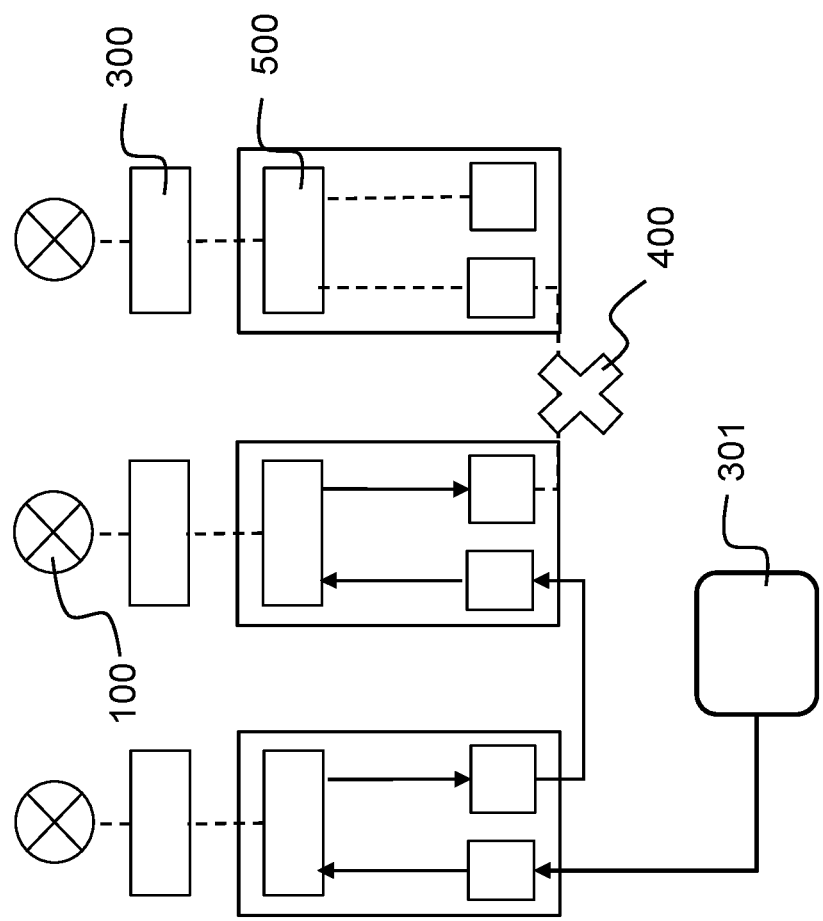
FIG. 6 is a schematic representation of an Ethernet-based solution according to the prior art, and illustrates what happens when there is a problem with the cabling.

FIG. 5 and FIG. 6 show a schematic representation of a known Ethernet-based solution as is known from the prior art. FIG. 5 and FIG. 6 show a topology in which the devices 100 are connected in series. A control unit 300 and a switch 500 are provided for each device 100. The switch 500 determines whether the data are intended for this device 100, or intended for a subsequent device 100. In the first case, the data are relayed to the control unit 300, and in the other case the data are relayed to the next device 100. FIG. 5 illustrates what happens in the case of such a known ethernet-based solution in the event of an interruption 302 in the supply of power to a device 100. In the event of such an interruption 302 in the power supply for a device 100, in the case of FIG. 5 for the first device, the switch 500 of the affected device 100 will also be disrupted. Because of this, the data that are received by the first device 100 are no longer relayed to the other devices 100. As a result, the data traffic comes to a standstill. FIG. 6 illustrates that the data traffic also comes to standstill in the event of a fault 400 in a communication cable: in FIG. 6, there is no longer any data traffic to the last of the devices 100 connected in series. The Ethernet-based solution such as known from the prior art therefore does not allow redundant control to be obtained.

Figure 7:
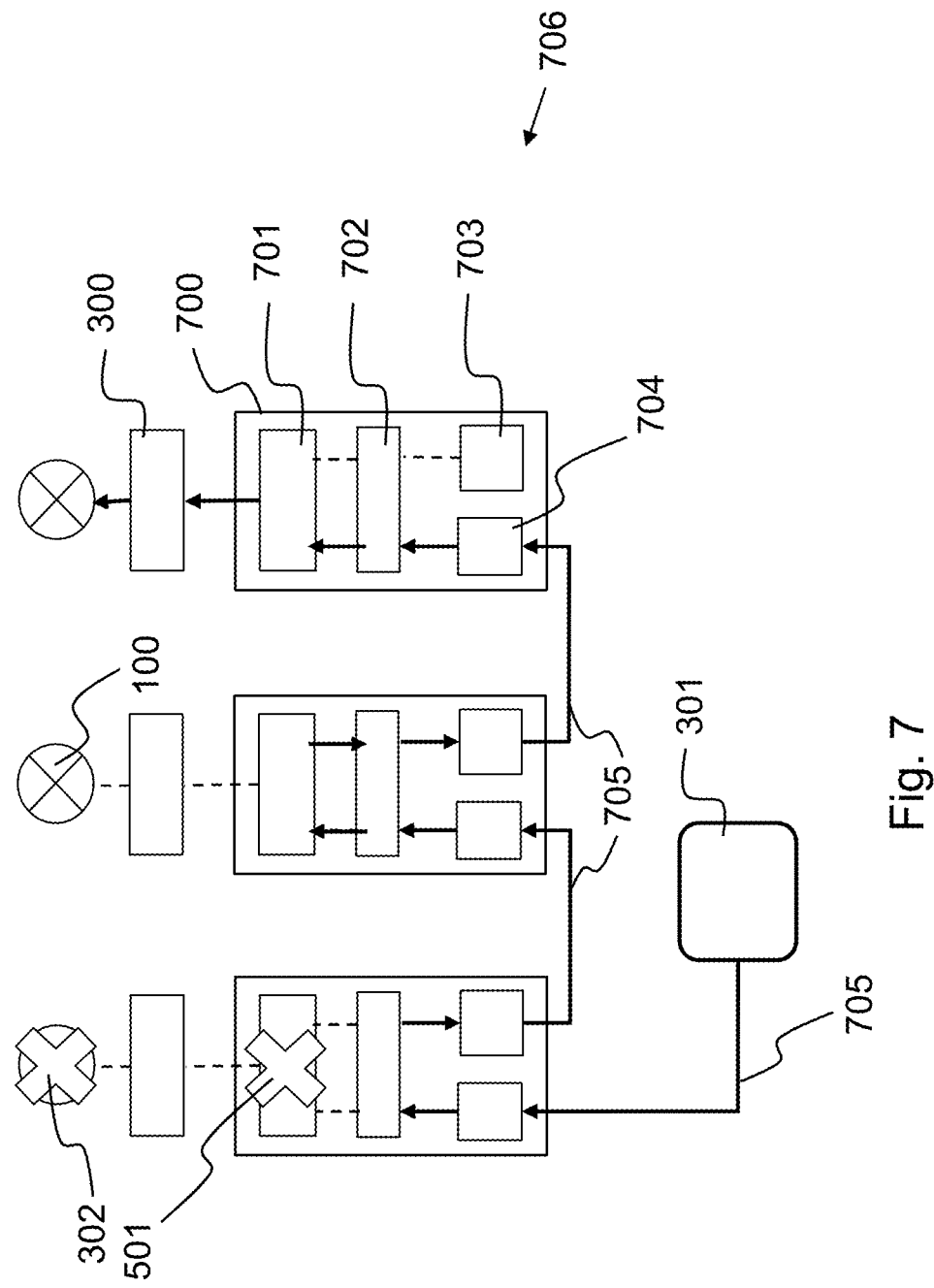
FIG. 7 is a schematic representation of an embodiment of a system according to the invention, and illustrates what happens when the supply of power to a device is interrupted.
Figure 8:
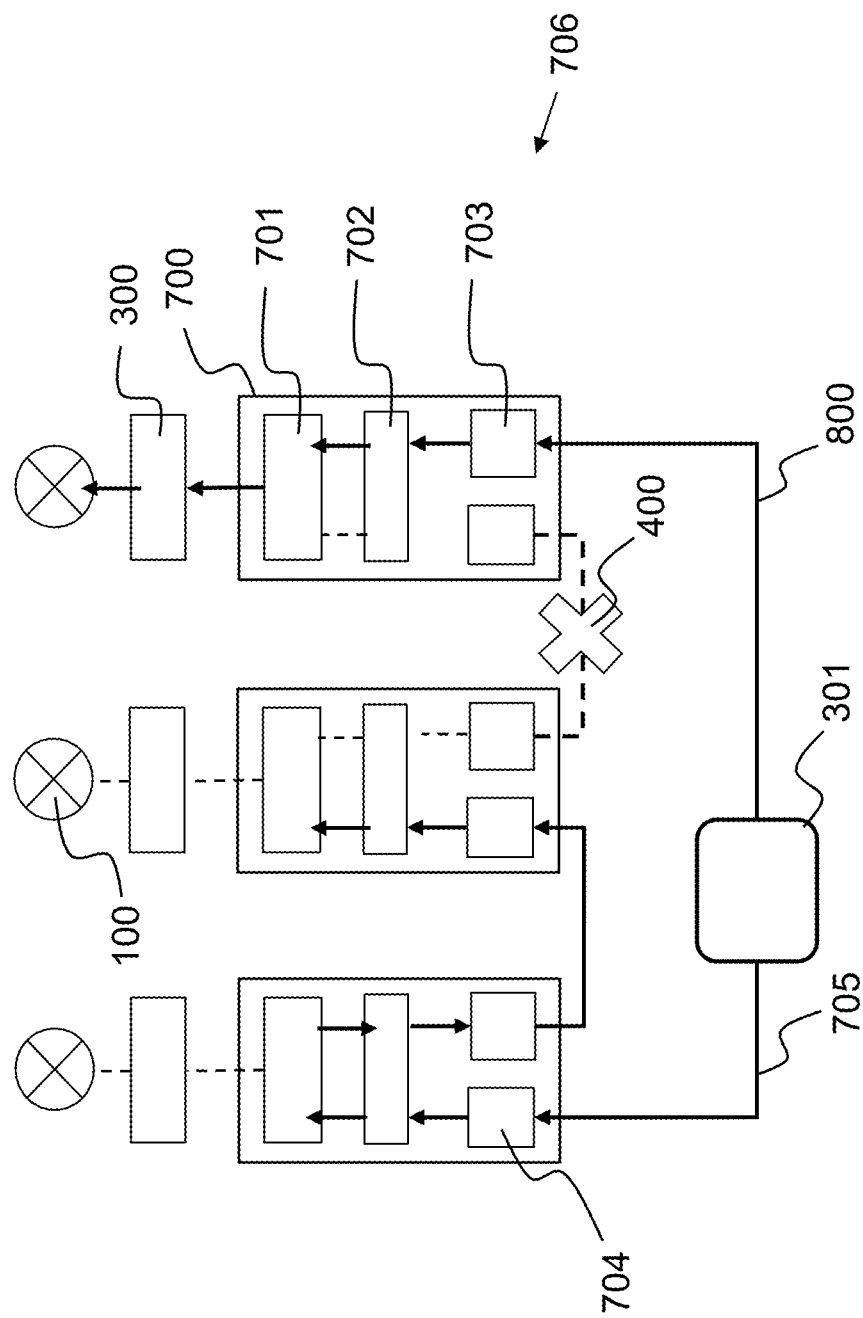
FIG. 8 is a schematic representation of an embodiment of a system according to the invention, and illustrates when there is a problem with the cabling.

FIG. 7 and FIG. 8 show a schematic representation of a system 706 according to an embodiment of the invention. A central management unit 301 generates data, for example control commands, which are communicated to devices 100 via data connections 705. The central management unit 301 additionally comprises a monitoring module 1205, as is illustrated in FIG. 12. Each device 100 is controlled by a control unit 300. In addition, a communication unit 700 is provided per device 100. In the embodiment of FIG. 7 and FIG. 8, the devices 100 are connected in series, wherein each device 100 receives data from a previous device 100 or the central management unit 301, and relays data to a subsequent device 100. Other topologies are however possible without departing from the invention. The communication unit 700 comprises a first communication port 704 and a second communication port 703, which connect the communication unit 700 to the data connections 705. The communication unit 700 further comprises a bypass component 702 and a switch component 701. The switch component decides whether data received via the first communication port 704 are intended for the device 100, or should be relayed to a subsequent device 100 via the second communication port 703. For example, in FIG. 7, the second device 100 relays the received data to the third device 100, while the switch component 701 of the third device 100 relays the data to the control unit 300. The switch component is for example a configurable switch, i.e. a "managed switch", in combination with a microprocessor. In this case the microprocessor is located between the managed switch and the control unit. FIG. 7 also illustrates the operation of the bypass component 702, more specifically in the event of an interruption 302 occurring in the supply of power to the first device 100. When the power is being supplied normally to a device 100, such as is the case for the second and third devices 100 in FIG. 7, the bypass component 702 is in a first state. In this case, a data connection is formed between the first communication port 704, the switch component 701 and the second communication port 703, and the switch component 701 functions as normal. When there is an interruption 302 in the power supply for the first device 100, the bypass component 702 switches to a second state, with a direct data connection being established between said communication port 704 and the second communication port 703. In this way, the data traffic experiences no disturbance despite the fact that the switch component 701 has also been disrupted as a result of the interruption 302 in the power supply; rather, the switch component 701 is bypassed in this case. Therefore, by means of the invention, redundant control is obtained in the event of an interruption 302 in the supply of power to a device 100.

FIG. 8 also illustrates an embodiment of the invention. The invention allows the devices 100 to be connected to one another in such a way that rings are formed. For example, in the embodiment of FIG. 8, an extra data connection 800 has been added. The figure illustrates how redundancy can be obtained thereby in the case of a fault 400 in a communication cable. In the case of the first and second devices 100 in FIG. 8, the switch component 701 receives data via the first communication port 704, and it transmits data via the second communication port 703. As a result of the fault 400, the communication unit 700 of the third device 100 can no longer receive data via its first communication port 704. However, it is still possible to reach the third device 100, namely via an alternative route along the data connection 800. Thus, the switch component 701 will now receive its data via the second communication port 703. Reversing the data traffic in this way is possible by providing the switch component 701, which in this embodiment is configurable, with another configuration setting. For this, a suitable protocol is used, for example RSTP (Rapid Spanning Tree Protocol) (IEEE 802.1w) is employed. In this way, the invention allows redundant control to be obtained.

Figure 9:
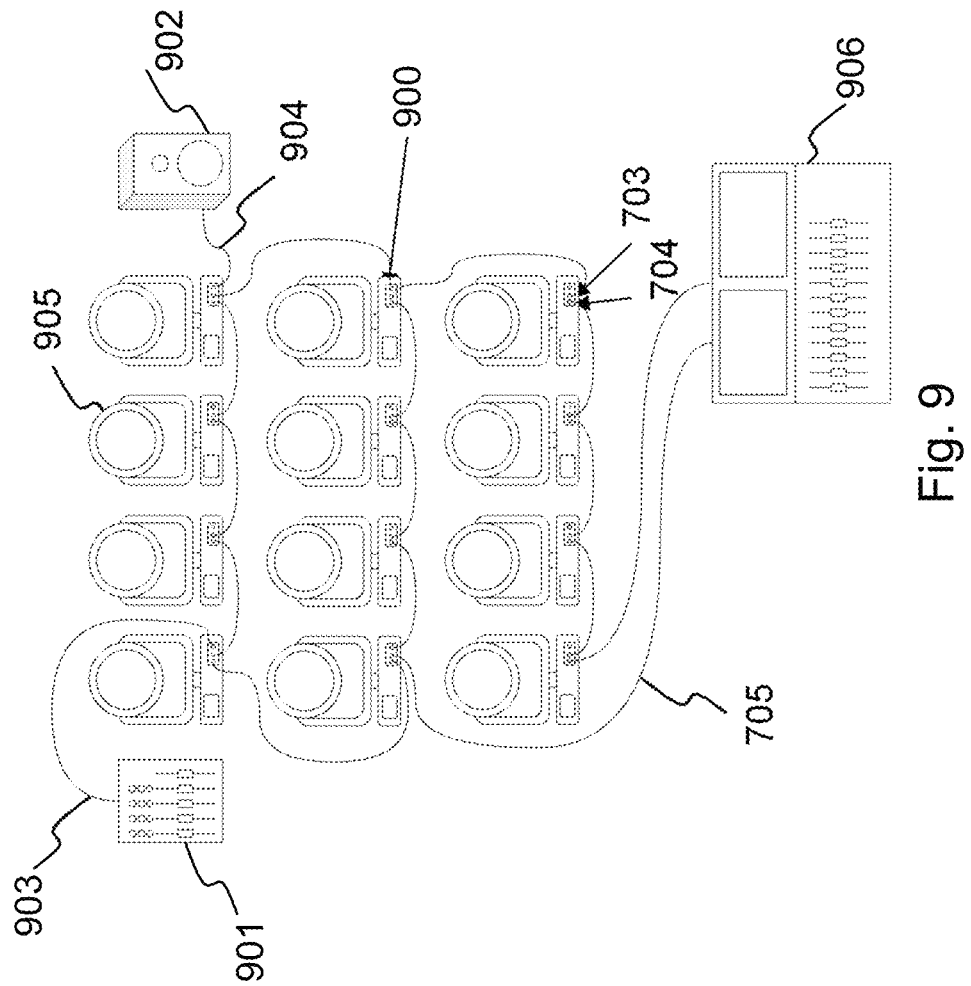
FIG. 9 shows a possible topology according to an embodiment of the invention.

FIG. 9 shows a possible topology according to an embodiment of the invention. In this embodiment, an installation of lights 905 is controlled from a central lighting console 906, employing data connections 705. The data connections are suitable for full-duplex communication. For example, they employ full-duplex Ethernet technology. Each light 905 has a first communication unit 700, comprising a first communication port 704 and a second communication port 703. In the embodiment of FIG. 9, each communication unit 700 also has a third communication port 900. Each communication port is suitable for connection to a data connection 705. In the embodiment of FIG. 9, a sound console 901 is additionally present, which generates data for controlling a loudspeaker 902. The data connection 903 allows the sound console 901 to be connected to the network, while a data connection 904 connects the loudspeaker 902 to the network. Both data connections 903 and 904 are suitable for audio over IP.

The user can connect the devices 905 to one another via a topology that makes it as easy as possible for the user; in the process, the user does not have to take into account a maximum number of devices 905 on one line. The user can connect the devices 905 to one another in such a way that rings are formed, as is illustrated in the embodiment of FIG. 9. As a result, the degree of redundancy is increased. The user can additionally employ the third port 900 to obtain a desired network topology. The use of Ethernet switches in the network that are compatible with the specifications of the invention is allowed in order to make it even easier for the user.

The invention also offers the possibility of connecting a plurality of types of user groups on the network which has already been formed, by interconnecting the communication ports. This can be achieved by means of one or more extra output ports. By using various VLANs, for example IEEE 802.1Q or variants, data packets for other purposes, for example audio, can be conveyed without interruption. The invention will automatically recognize when a device is connected to the invention again over one of these ports and provide these ports with the correct configuration.

In an embodiment of the invention, the communication unit 700 is embodied as an add-on board, which may be produced independently of the host board. For example, the host board already forms part of an existing installation and comprises the technology for controlling the light. In this embodiment, the communication unit 700 is for example provided with a gold-plated edge connector which corresponds to the connection socket on the host board provided for this purpose. The add-on board receives its power supply from the host board, and is provided with a voltage regulator which provides all of the components with the correct voltage value. In addition to the communication ports 703, 704 mentioned above, the communication unit according to this embodiment is provided with two extra ports: a port which allows connection the connector via a magnetic, and a port which is connected to the processing unit of the host board during operation. In addition, for example the third communication port 900 may be designed in such a way that it may act as a PD (powered device). As a result, by delivering PoE (Power over Ethernet), the invention is able to start up by itself. Communication with another device can be brought about without the host device having to start up or to be supplied with power for this.

Figure 10:
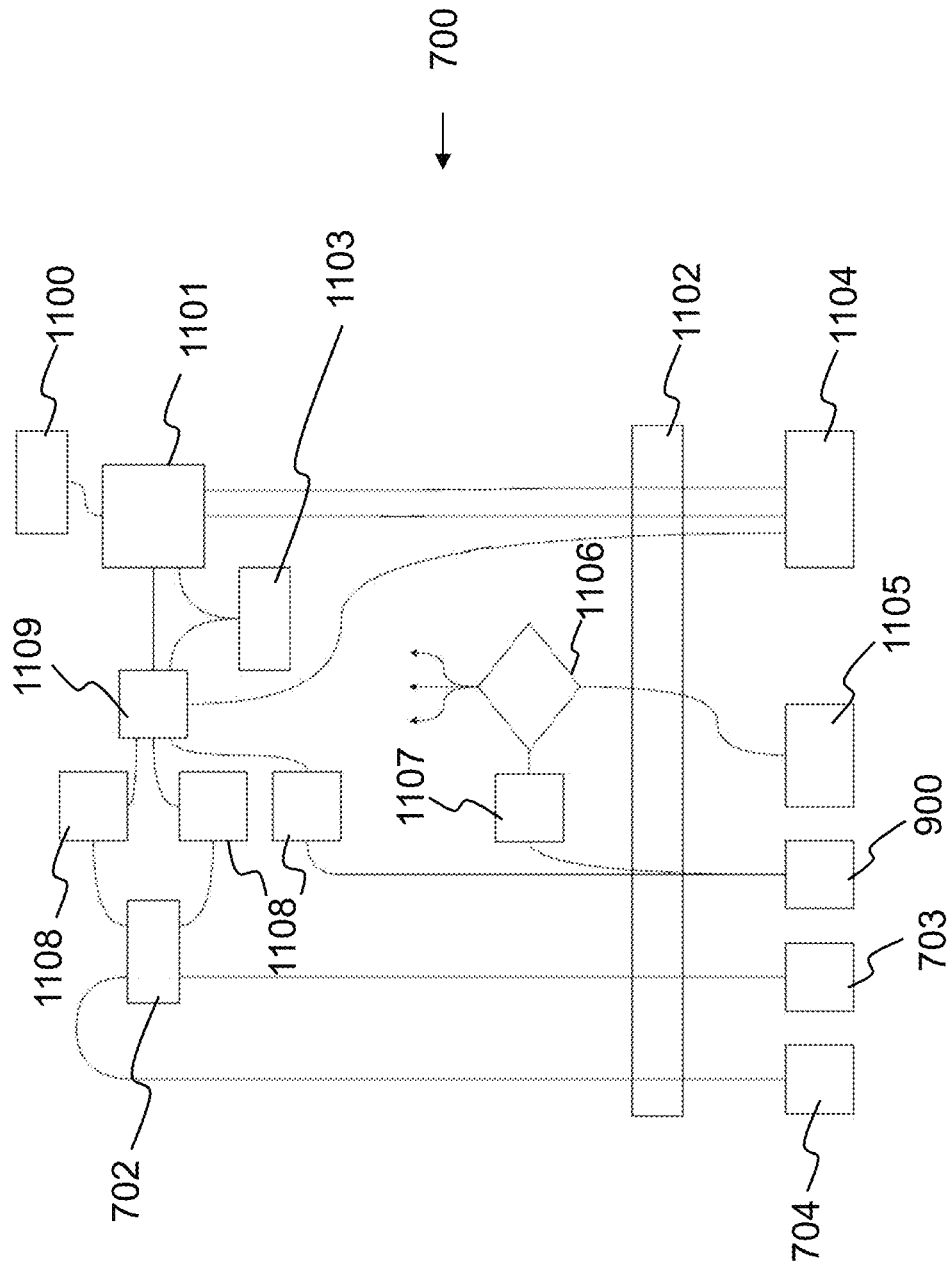
FIG. 10 shows an embodiment of the communication unit according to the invention, and the cooperation with a host board.

FIG. 10 shows an embodiment of the communication unit 700 according to an embodiment of the invention, as well as the cooperation with a host board. The following components are represented schematically: bypass component 702, first communication port 704, second communication port 703, managed switch 1109, microprocessor/CPU 1101, memory 1100, clock 1103, magnetic 1108, connector 1102, third communication port 900, host power supply 1105, PoE PD driver 1107, voltage regulator 1106, host CPU 1104.

In the embodiment of FIG. 10, the switch component 701 comprises a managed switch 1109 and a microprocessor/CPU 1101. For example, a KSZ9477S managed switch by Microchip is employed in the embodiment, which is a managed Ethernet switch with advanced features. For example, the managed switch 1109 supports the following features: Non-blocking wire-speed Ethernet switching fabric, Rapid spanning tree protocol (RSTP) support for topology management and ring/linear recovery, Jumbo packet support, Fast Link-up option, Auto-negotiation and Auto-MDI/MDI-X support, IEEE1588v2 Precision Time Protocol support, Time-stamping on all ports, Precision GPIO pin timed with AVB/1588 clock, Full-featured forwarding and filtering control, including Access Control List (ACL) filtering, IEEE802.1X support (Port-Based Network Access Control), IEEE802.1Q VLAN support for 128 active VLAN groups and the complete range of 4096 VLAN Ids, IEEE802.1p/Q tag insertion or removal on a per-port basis and support for double-tagging, VLAN ID tag/untag options on a per-port basis, IGMPv1/v2/v3 snooping for multicast packet filtering, IPv6 multicast listener discovery (MLD) snooping, QoS/CoS packets prioritization support: 802.1p, DiffServ-based and re-mapping of 802.1p priority field per-port basis over four priority levels, IPv4/IPv6 QoS support, Four priority queues with dynamic packet mapping for IEEE802.1p, IPv4 DIFFSERV, IPv6 TrafficClass.

A managed switch 1109 according to this embodiment is connected, on the communication unit 700, to a microprocessor 1101 via RGMII and SPI. These communication lines are used for configuring the switch 1109 and also for retrieving and receiving information that is sent to the device over the network. The microprocessor 1101 is for example an SAMA5D36A by Microchip. This is a high-performance ARM Cortex-A5 MPU. It supports Gigabit EMAC, USB connectivity, UART and an LCD controller. This has a hardware encryption engine and support for a secure hash algorithm (SHA). The available interfaces, such as for example USB, UART or Ethernet, are made available to the host board. This is used to route the incoming communication for the host board.

An embodiment of the communication unit 700 is further provided with a memory 1100. This comprises the volatile main memory, for example a DDR2 memory, and a non-volatile memory for storing software and captured data, inter alia.

FIG. 11 illustrates an embodiment of the bypass component 702 according to the invention. FIG. 11 likewise shows the first communication port 704, the second communication port 703 and the switch component 701.

In the embodiment of FIG. 11, the bypass component 702 consists of a switch of eight double-pole monostable changeover relay switches 1002. Other embodiments are however possible in order to arrive at a similar functionality of the bypass component 702. In the embodiment of FIG. 10, the Ethernet connection which enters via the first communication port 704 is connected to four relays. In an analogous manner, the second communication port 703 is also connected to four relays. When the communication unit 700 is supplied with power, the communication ports 703 and 704 are connected to the switch component 701. This first state is shown in FIG. 11. When the communication unit 700 receives no power supply, the changeover relay switches 1002 are in the passive idle state. As a result, the bypass component 702 switches to a second state in which the relays 1002 of the first communication port 704 are connected to the relays 1002 of the second communication port 703. The Ethernet pairs of both communication ports are thus connected to one another. This connection results in a new communication between the devices 905 which are connected to the first and second communication ports 704 and 703, respectively, without the device 905, which is now without power, causing this to be interrupted. If the device 905 gets power back, then the changeover relay switches 1002 will switch to the active state, and each of the communication ports 704 and 703 is connected to the switch component 701. The entire device will then behave as a switch hop in the network, without the changeover relay switches 1002 forming an obstruction thereto.

FIG. 12 illustrates how, via the use of the embodiment of the communication unit 700 described above in an installation, an advanced information exchange with the network can occur. In particular, a schematic representation is shown of modules that are present in the central management unit 301, according to one embodiment of the invention. In the embodiment of FIG. 12, control data 1202 are generated in a module 1200 and one of the central management unit 301, which data are communicated to the device. By virtue of the use of full-duplex communication, other information can simultaneously be exchanged between the devices 100 and the central management unit 301. For example, information is collected from the network, and this is processed in a module 1200 in the management unit 301. Alternatively, it is also possible for information to be sent from a module 1200 to the device 100, for example upon setup and configuration.

An example of possible information exchange 1203 with the network occurs when connecting the devices 100, where the invention allows much more straightforward setup and configuration to be obtained than via the "patching" process as known from the prior art. When a device 100 is supplied with power, it is able to send out a discovery message 1208 over the network. For this, the central management unit 301 comprises a discovery module 1204. The discovery message 1208 comprises individual information such as for example the identification of the device. An application such as the discovery module 1204 can receive the discovery messages 1208 and store them.

Information such as metadata and information relating to connected ports (the "neighbours") can also be collected from the network. For this, the central management unit 301 comprises a monitoring module 1205. On the basis of the received information, in the form of monitoring messages 1209, a mapping module 1206 in the application is able to construct a real-time connection diagram of the network which visually depicts the topology of the network, for example which devices 100 are present and how they are cabled. In this way, the user is thus able to identify all connected devices 100 quickly and clearly. The monitoring message 1209 may also comprise a characteristic relating to the state of the device 100, or a characteristic relating to the state of the neighbouring device. In this way, an error message can be sent, or a device 100 can indicate that its neighbour has gone dead.

The embodiment of FIG. 12 further comprises a configuration module 1207, by means of which the user can provide each device 100 with an identification number ("fixture-id") in a straightforward manner. In addition, the user can modify the depicted topology in the application in terms of relative position, so that the physical setup can be reflected better in the application. "Smart syntax" may be employed in order to make this process even easier. An example of this is the sequential provision of the identification number (e.g. 1, 2, 3, . . . up to and including 12) as a way of indicating the first ("1") and last ("12") devices in the sequence. In this example, the identification numbers 2 up to and including 11 are assigned automatically.

Information on the connected neighbouring devices 100 on the relevant port(s) can, for example, be requested when changing a port status by means of LLDP (Link Layer Discovery Protocol) (IEEE 802.1AB-2009 or variants). De LLDP data can be made available via an API. As a result, the possibility is created for the applications to display a complete cabling topology.

Each application that is compatible with the invention can retrieve metadata on each connected device 100 from the relevant device 100. All underlying protocols and configuration parameters are automatically set upon configuration via the transmission of a configuration message 1210, which results in much faster and more straightforward configuration than is the case with the known "patching". Examples of metadata are: Fixture ID, Position, Status, Real-time configuration information, such as for example the number of connected LEDs, User history, Network location, Geolocation, User configuration, Firmware, Visual representation of use attributes, Virtual representation of the device for reuse in visualization software.

Another example of possible information exchange with the network is the real-time monitoring of the network, via a mapping module 1206. In this case, received monitoring messages 1209, comprising information on the devices and their neighbours, are used to produce a real-time connection diagram, which is used for continuous monitoring by the user. In this case, for example, the diagram not only shows which devices are present and how the physical cables run, but also which data connections are active. For example, the data from an RSTP protocol, required to achieve ring redundancy, may be interpreted, processed and made available via an API.

Another example of possible information exchange with the network is the use of a synchronization module 1212. For example, PTP (Precision Timing Protocol, for example PTPv2 (IEEE 1588v2)) or a variant is employed, by means of which the processing time in one communication unit 700 is measured using timestamping. This value is added to the PTP packet, after which this process can be repeated on each hop. In this way, the synchronization module 1212 is able to measure, when the system comes online or in the event of changes to the topology, how long it takes for all network packets to be received by all receiving devices, in the form of time information 1211. Using these results, the maximum frame rate and maximum lag can be determined. In addition, this time information 1211 can be used to obtain accurate synchronization across the various devices 100. In this case, commands relating to the exact time when an action should be performed are incorporated into the data sent to the devices 100. The device 100 may perform the action to be performed only at the exact time indicated by the command for this. For example, the synchronized command is issued by placing the synchronized precision GPIO pin at the exact point in time of execution.

An embodiment of the invention is also possible in which a plurality of receivers are set, which receive the same or different information from the device. An example of this may be that receiver A, on the one hand, receives error information and receiver B, on the other hand, is subscribed to all monitoring from the device. Examples of this are alerts for faults or maintenance requirements, problems that have arisen or data from sensors of whatever kind.

An embodiment of the invention is also possible in which the network can be controlled by a plurality of controllers if optionally set. This is possible simultaneously: the embodiment of the invention can be set with priority rules in combination with these commands. The current state of the art allows this only in an external unit, in what is known as a merging engine. The problem with the current state of the art is that it struggles with limitations with regard to the synchronous execution of these operations for many receivers. The invention makes this possible in a decentralized manner, in each device, thereby obviating the need for a merging engine. As a result, the invention affords the singular possibility of controlling many devices with a plurality of controllers simultaneously with a high degree of accuracy and synchronization. This additionally increases redundancy.

Although the present invention has been illustrated by means of specific embodiments, it will be clear to the person skilled in the art that the invention is not limited to the details of the above illustrative embodiments, and that the present invention may be carried out with various changes and modifications without thereby departing from the area of application of the invention. Therefore, the present embodiments have to be seen in all respects as being illustrative and non-restrictive, and the area of application of the invention is described by the attached claims and not by the above description, and therefore any changes which fall within the meaning and scope of the claims are therefore incorporated herein. In other words, it is assumed that this covers all changes, variations or equivalents which fall within the area of application of the underlying basic principles and the essential attributes of which are claimed in this patent application. In addition, the reader of this patent application will understand that the terms "comprising" or "comprise" do not exclude other elements or steps, that the term "a(n)" does not exclude the plural and that a single element, such as a computer system, a processor or another integrated unit, can perform the functions of various auxiliary means which are mentioned in the claims. Any references in the claims cannot be interpreted as a limitation of the respective claims.

The terms "first", "second", "third", "a", "b", "c" and the like, when used in the description or in the claims, are used to distinguish between similar elements or steps and do not necessarily indicate a sequential or chronological order. In the same way, the terms "top side", "bottom side", "above", "below" and the like are used for the sake of the description and do not necessarily refer to relative positions. It should be understood that these terms are interchangeable under the appropriate circumstances and that embodiments of the invention can function according to the present invention in different sequences or orientations than those described or illustrated above.

The invention claimed is:

1. A system for controlling an entertainment installation comprising one or more devices, wherein said system comprises:
    a central management unit suitable for generating data, comprising control data for controlling said one or more devices of said entertainment installation;
    for each of said one or more devices, a control unit suitable for, on the basis of received control data, putting the device in a state for performing a desired action;
    for each of said one or more devices, a communication unit;
    one or more data connections suitable for communicating data between said central management unit and said communication unit of said one or more devices, suitable for full-duplex communication,
wherein said communication unit comprises:
    a first communication port and a second communication port, suitable for connecting said communication unit to said data connections;
    a switch component suitable for exchanging data with said management unit, via full-duplex communication, said switch component comprising a managed switch and a microcontroller;
    a bypass component suitable for switching said communication unit between a first state and a second state, in such a way that, in said first state, said first communication port and said second communication port are connected to said switch component, and, in said second state, said first communication port is connected to said second communication port,
wherein said central management unit comprises a monitoring module suitable for receiving monitoring messages from said one or more devices, comprising one or more characteristics of said device and/or of a device connected to said device, and
wherein said central management unit further comprises a mapping module suitable for producing a connection diagram on the basis of said monitoring messages, said connection diagram comprising one or more characteristics of said one or more devices and their connections.

2. The system according to claim 1, wherein said connection diagram indicates via which connections data are actually transferred, thereby allowing for real-time monitoring of the network of devices.

3. The system according to claim 1, wherein said system further comprises a discovery module suitable for receiving and/or transmitting discovery messages from and/or to said one or more devices, comprising one or more identifying characteristics of said device.

4. The system according to claim 1, wherein said system further comprises a configuration module suitable for sending a configuration message to a said communication unit comprising one or more parameters for configuring said communication unit or said control unit.

5. The system according to claim 1, wherein said system further comprises a synchronization module suitable for collecting time information relating to said communication unit and for incorporating said time information into said data.

6. The system according to claim 1, wherein said data connections employ full-duplex Ethernet technology.

7. The system according to claim 1, wherein said switch component is configurable.

8. The system according to claim 1, wherein said bypass component is suitable for switching, when said device is active, said communication unit to said first state, and, when said device is inactive, switching said communication unit to said second state.

9. The system according to claim 1, wherein said bypass component employs one or more switches or relays between said switch component and each of said first communication port and said second communication port.

10. The system according to claim 1, wherein said communication unit further comprises:
    one or more extra communication ports suitable for connecting said communication unit to a data connection suitable for full-duplex communication.

11. A communication unit according to claim 10, wherein one or more of said extra communication ports are suitable for receiving electric current.

12. The system according to claim 1, wherein said system further comprises:
    one or more devices, each of said devices being suitable for performing an action; and
    for each of said one or more devices, a control unit suitable for, on the basis of received control data, putting the device in a state for performing the desired action.

13. The system according to claim 12, wherein said one or more devices comprise multiple lights, and for each of said lights, said control unit is suitable for putting the light in a state wherein the light is turned on and/or a state wherein the light is turned off and/or a state wherein the desired light intensity is set and/or a state wherein the desired color is set.

14. The system according to claim 1, wherein said system is suitable for controlling said one or more devices of said entertainment installation based on a Digital Multiplex (DMX) protocol.

15. A method for controlling an entertainment installation comprising one or more devices, comprising:
    providing a central management unit, one or more data connections suitable for full-duplex communication, a control unit for each of said one or more devices, and a communication unit for each of the one or more devices,
    wherein said communication unit comprises:
    a first communication port, a second communication port, a bypass component and a switch component, said switch component comprising a managed switch and a microcontroller;
    generating data by said central management unit, said data comprising control data for controlling said one or more devices of said entertainment installation;
    communicating data between said central management unit and a communication unit, via said data connections;

controlling each of said one or more devices by said control unit, wherein, on the basis of received control data, the device is put in a state for performing a desired action;

controlling data communication by means of said communication unit, comprising:

communicating data via said data connections, connected to said first and/or second communication port;

switching said communication unit between a first state and a second state, wherein, in said first state, said first communication port and said second communication port are connected to said switch component, and, in said second state, said first communication port is connected to said second communication port, exchanging data between said switch component and said management unit, via full-duplex communication;

receiving, by said central management unit, monitoring messages from said one or more devices, comprising one or more characteristics of said device and/or of a device connected to said device, and producing, by said central management unit, a connection diagram on the basis of said monitoring messages, said connection diagram comprising one or more characteristics of said one or more devices and their connections.

* * * * *